(12) United States Patent
Chen et al.

(10) Patent No.: US 7,375,780 B2
(45) Date of Patent: *May 20, 2008

(54) METHOD OF MANUFACTURING A RUGGED REFLECTOR FOR LIQUID CRYSTAL DISPLAY DEVICES

(75) Inventors: Ching-Hung Chen, Tao Yuan Shien (TW); Lung-Pao Shin, Tao Yuan Shien (TW); Ming-Yan Tsai, Tao Yuan Shien (TW)

(73) Assignee: AU Optronics Corporation, Hsin-chu (TW)

( * ) Notice: Subject to any disclaimer, the term of this patent is extended or adjusted under 35 U.S.C. 154(b) by 7 days.

This patent is subject to a terminal disclaimer.

(21) Appl. No.: 11/269,616

(22) Filed: Nov. 9, 2005

(65) Prior Publication Data

US 2006/0139521 A1 Jun. 29, 2006

(30) Foreign Application Priority Data

Dec. 27, 2004 (TW) .............................. 93140777 A (51) Int. Cl.
*G02F 1/1335* (2006.01)

(52) U.S. Cl. ..................................... 349/113

(58) Field of Classification Search ................ 349/113, 349/114
See application file for complete search history.

(56) References Cited

U.S. PATENT DOCUMENTS

| 4,106,859 | A | 8/1978 | Doriguzzi et al. |
| 4,519,678 | A | 5/1985 | Komatsubara et al. |
| 5,917,567 | A | 6/1999 | Oh et al. |
| 6,774,965 | B2 * | 8/2004 | Nakashima et al. ........ 349/114 |
| 6,784,957 | B2 * | 8/2004 | Kanou et al. ................ 349/113 |
| 7,193,671 | B2 * | 3/2007 | Hashimoto et al. ......... 349/125 |
| 2001/0030717 | A1 * | 10/2001 | Kaneko et al. ............... 349/43 |
| 2002/0008801 | A1 * | 1/2002 | Fukada et al. ................ 349/56 |
| 2002/0051109 | A1 | 5/2002 | Nakanishi et al. .......... 349/147 |
| 2003/0076467 | A1 * | 4/2003 | Wang .......................... 349/115 |
| 2003/0118920 | A1 * | 6/2003 | Johnstone et al. ............. 430/5 |
| 2003/0170423 | A1 * | 9/2003 | Katsumoto et al. ......... 428/141 |
| 2003/0197178 | A1 * | 10/2003 | Yamazaki et al. ............ 257/59 |
| 2003/0232252 | A1 * | 12/2003 | Mancini et al. ................. 430/5 |
| 2004/0141134 | A1 * | 7/2004 | Nakanishi et al. .......... 349/143 |
| 2006/0176414 | A1 | 8/2006 | Chen et al. |

OTHER PUBLICATIONS

Dictionary.com entry for "rugged." http://dictionary.reference.com/browse/rugged.*

* cited by examiner

*Primary Examiner*—Andrew Schechter
*Assistant Examiner*—Matthew Tynan
(74) *Attorney, Agent, or Firm*—Bacon & Thomas PLLC (57) ABSTRACT

A method of manufacturing a reflecting substrate in a liquid crystal display device is disclosed, comprising the steps of: (a) providing a substrate having a first metal layer, wherein the first metal layer is formed with at least one soft metal or the alloys thereof; and (b) forming an aluminum nitride layer on the first metal layer. The method of the present invention is capable of forming a rugged, shining, reflective layer on a transflective, or a reflection type TFT LCD with simple steps and low cost.

1 Claim, 7 Drawing Sheets

METHOD OF MANUFACTURING A RUGGED REFLECTOR FOR LIQUID CRYSTAL DISPLAY DEVICES

BACKGROUND OF THE INVENTION

1. Field of the Invention

The present invention relates to a LCD device and more particularly, to a LCD device with rugged, shining, reflective layer.

2. Description of Related Art

LCD devices are usually available in four types: reflective type, transflective type, projective type and transmissive type. Other than reflective type, most LCD devices are transmissive type. The light source of this type mainly depends on the backlight behind the liquid crystal panel to make the LCD visible. Due to limited brightness, the screen becomes blur and invisible when exposed to sunlight directly because the sunlight reflected from the surface of the screen overshadows the images formed on the LCD.

The reflective type LCD doesn't emit light itself but becomes bright by reflecting the light coming into the liquid crystal panel by way of a reflective substrate rather than glowing by itself. Because the elemental principle of brightness of the reflective type LCD is different from that of the transmissive type LCD, the reflective type LCD does not need backlight or build-in illumination. Moreover, the brightness of the reflective type LCD can be provided by external light sources such as artificial light or natural light. Therefore, the brighter the external light source is, the brighter the reflective type LCD is, and the better the reflective type LCD for outdoor use will be. In addition, because less power for reflective type LCD consumes, this LCD device can be lighter, thinner and more energy-saving and more convenient for bright environment.

The conventional reflective type LCDs includes a layer of reflective material, such as Al or Cr, formed over the surface of a bottom substrate, and a rugged or uneven surface is formed for enhancing reflectivity. If a smooth mirror used as a reflective plate is attached to the back inner wall of the manufactured liquid crystal cell, an observer may look at his/her own image on the LCD panel. This is called "mirror reflective phenomenon." If the pattern over the reflective plate is in a shape of regular concave and convex wave, the reflected light will be in various colors even though the incident light is white. The surface of the reflective plate resembles the diffraction grating of a spectrometer and produces the same phenomenon. To solve the problem, i.e. to avoid the associated phenomenon of the reflective angle and the wavelength, the surface of the reflective plate is required to be irregularly roughened. The reflective light then includes concurrently positive reflective light and diffused reflective light.

Figure 1:
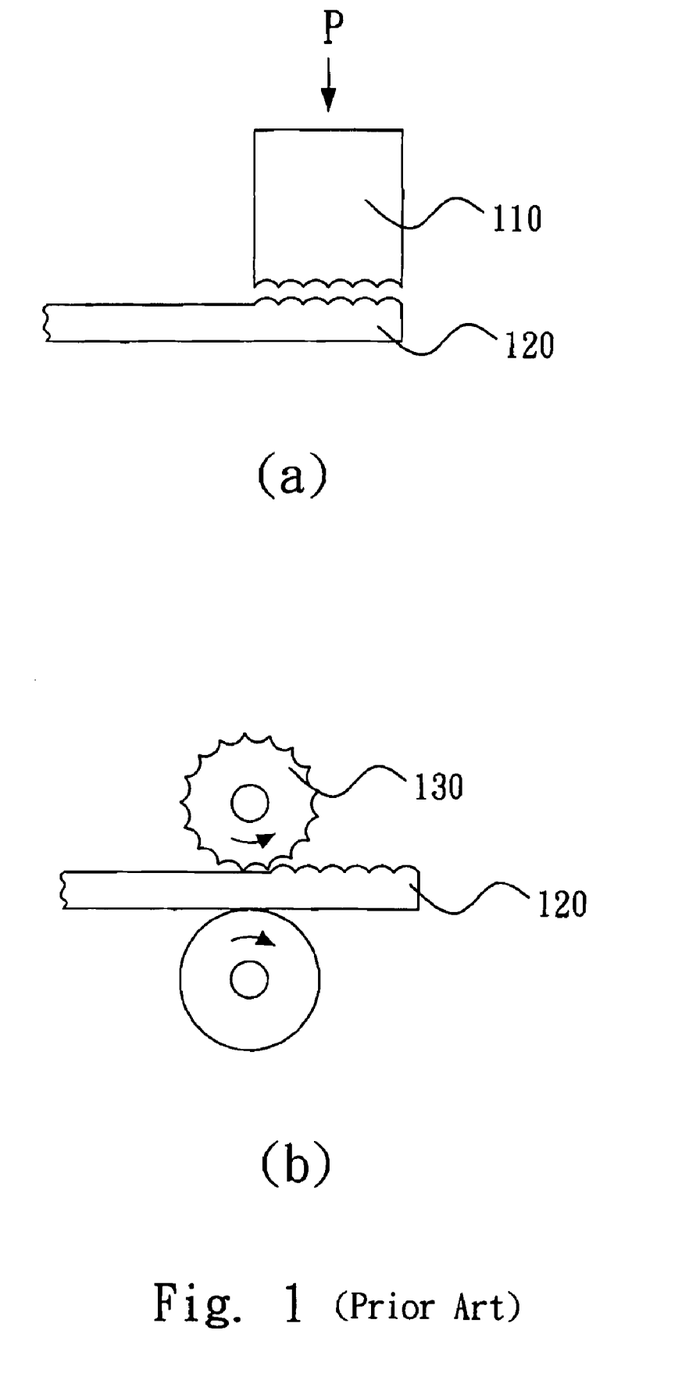
FIG. 1a-b is a cross-sectional view of prior art.
Figure 2:
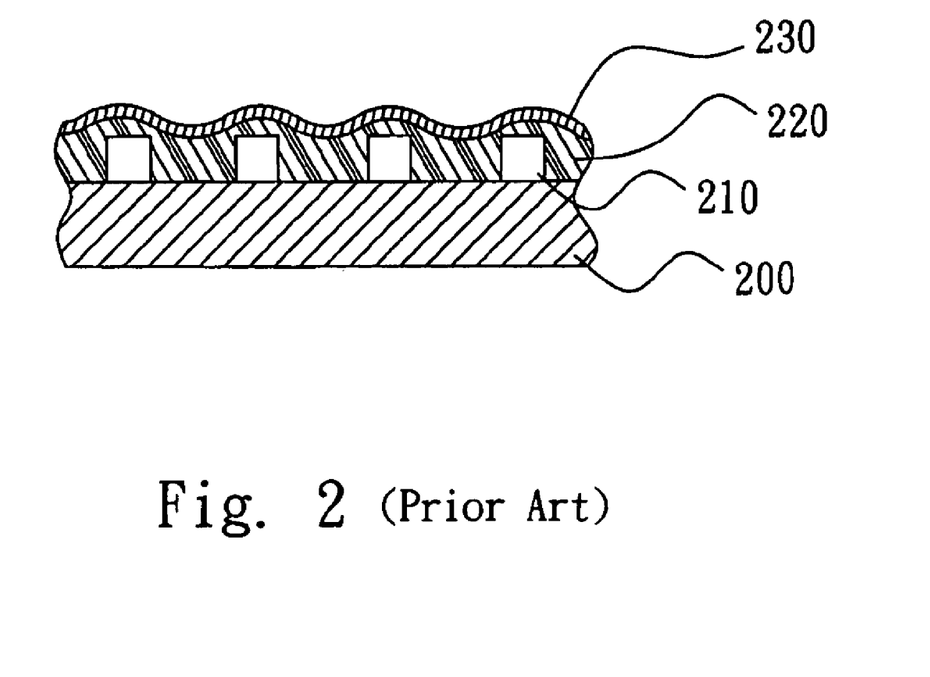
FIG. 2 is a cross-sectional view of prior art.
Figure 3:
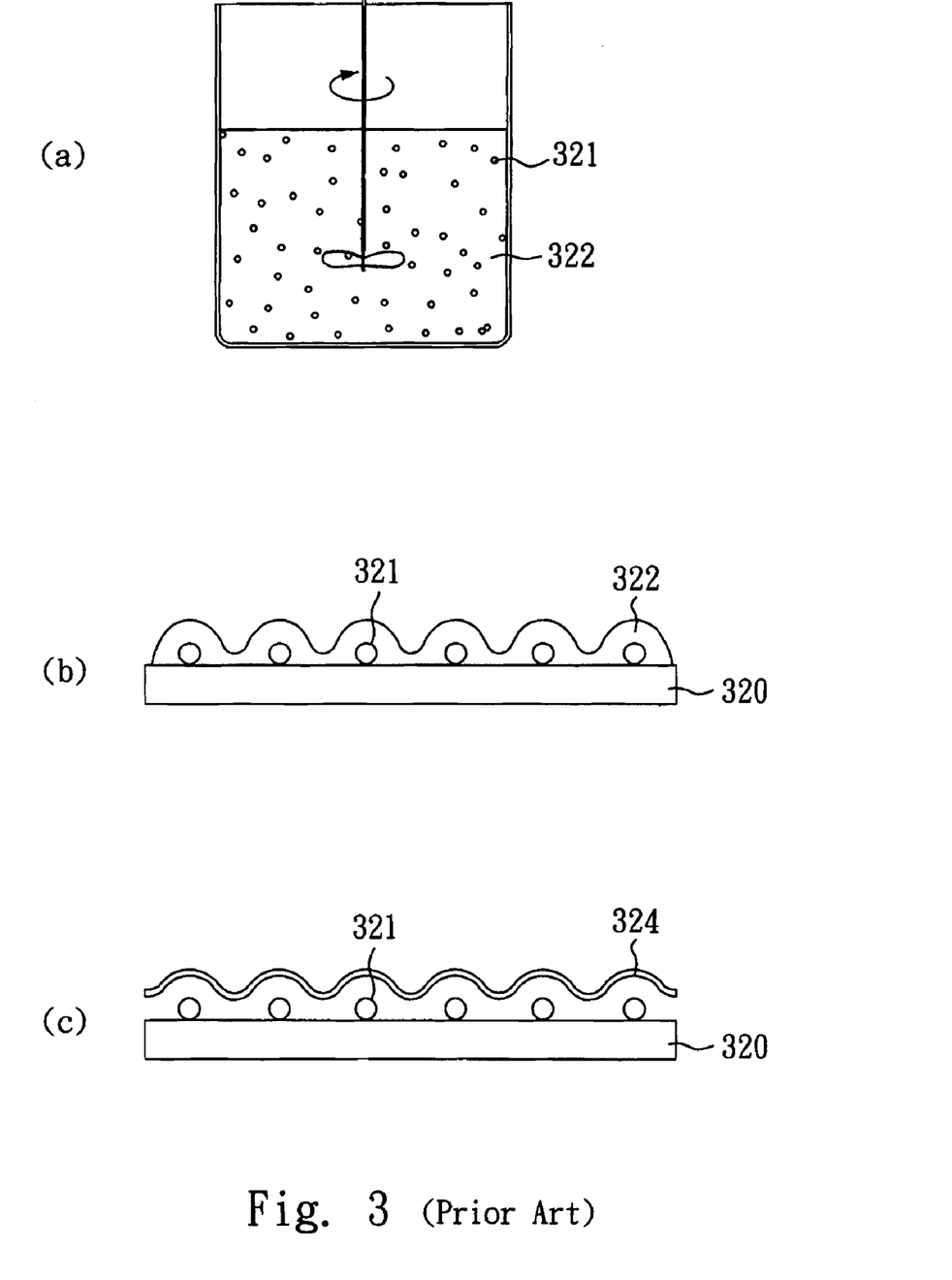
FIG. 3a-c is a cross-sectional view of prior art.

Doriguzzi et al., in U.S. Pat. No. 4,106,859, disclosed a method for manufacturing a rugged surface of an organic layer, particularly a casting method. An even organic layer 120 is roughened under pressure P with a rugged grooved mold 110 to form an irregular surface as shown in FIG. 1a; or as shown in FIG. 1b, an even organic layer 120 is roughened by a cylindrical mold 130 with rugged surface via rolling to provide an irregular surface. Other than the method of casting, Komatsubara et. al. in U.S. Pat. No. 4,519,678 disclosed another method, comprising: forming a projection pattern 210 over a substrate 200; applying a polymer resin layer 220 and a reflective metal film 230 on the projection pattern and the substrate. As shown in FIG. 2, a metal film with rugged surface is thus completed. In addition, Oh et. al. in U.S. Pat. Ser. No. 5,917,567 disclosed yet another method for forming a rugged surface, as shown in FIG. 3a-c. First, a plurality of spacers 321 and a polymer solution 322 are sufficiently mixed. Then, a thin layer of the polymer solution 322 containing the spacers 321 is applied on a substrate 320 by spin coating, and baked to form a thin layer of rough surface. The pixel electrode 324 with reflective character, made of material such as Al or Ag, is formed thereon by sputtering. This results in pixel electrode 324 with rugged surface. Alternatively, prior to a polymer solution 322 being distributed and baked to form a rough surface, a plurality of spacers 321 may be deposited over the substrate 320 first.

However, the foregoing methods require mechanical casting or the presence of spacers to form a rough surface. A reflective metal film cannot be formed unless a rough surface is formed first. They all involve tedious procedures and are not ideal for mass production. Surely one single step for forming a reflective metal film with rough surface will dramatically reduces the time and labor cost for the production.

SUMMARY OF THE INVENTION

The present invention provides a method for manufacturing a reflecting substrate, especially for use in manufacturing metal films with a rough surface. The atomic cells in the lattice are altered in the presence of nitrogen atoms, and due to the existence of nitrogen atoms, it makes the surface of the metal layer uneven because of twisted atomic cells in the metal lattice caused by inner repulsion once nitrogen is added into the metal layer. This method is simpler and easier than that of the prior art.

The method of the present invention for manufacturing a reflecting substrate, including the steps of:

(a) providing a substrate with a first metal layer over a surface, wherein the first metal layer is formed with at least one soft metal or the alloys thereof; and (b) forming a layer of aluminum nitride on the first metal layer.

The process of the present invention then proceed to subsequent necessary steps after the foregoing steps, or may proceed to step (c):

(c) removing the layer of aluminum nitride on the first metal layer before carrying out subsequent steps, such as the formation of a transparent conductive layer. Alternatively, a reflective layer may optionally be directly deposited on the rugged surface of aluminum nitride, and followed by subsequent steps. Because the reflective structure on the reflecting substrate is the first metal layer, the first metal layer is preferably light-reflective. In addition, numerous soft metals, preferably Al, Ag, Ni, Cu and Pt, are suitable for the first metal layer, which can be any soft metals with reflective character. Additionally, in order to increase the adhesion between the first metal layer and the substrate, a buffer layer may be formed between the first metal layer and the substrate to prevent the first metal layer from stripping from the substrate during the subsequent steps in a environment of extreme high temperature and high pressure. The buffer layer may be formed of any suitable material, preferably Ti, titanium nitride, Mo, Cr or the alloys thereof. In the method of the present invention, the method for forming the layer of aluminum nitride in the step (b) may be any deposition process, preferably by reactive sputtering or evaporating on an aluminum-containing surface. A thickness of the layer of aluminum nitride is altered by process conditions, preferably 150 Å-1500 Å.

Figure 7:
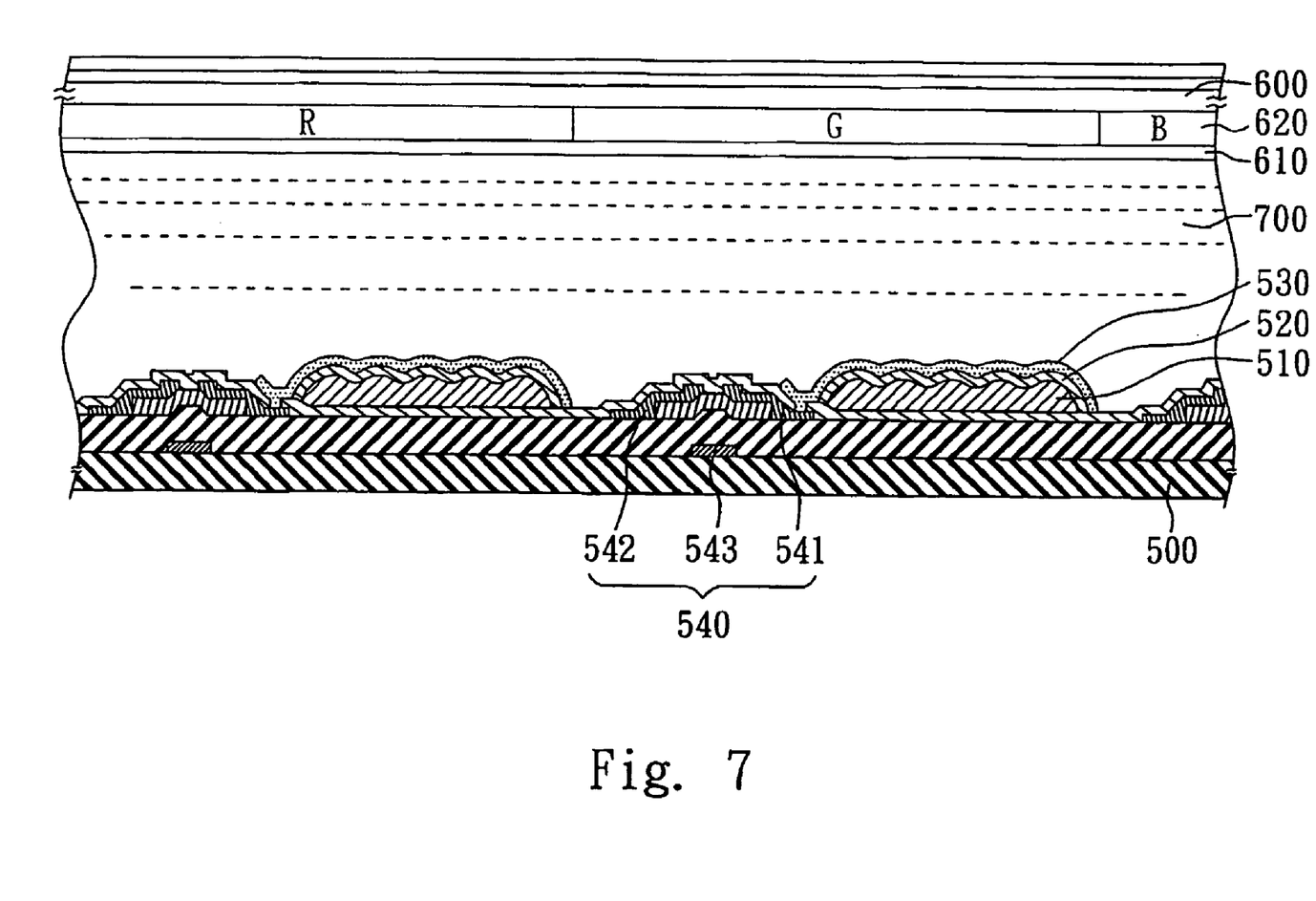
FIG. 7 is a cross-sectional view of a LCD device of the present invention.

Please refer to FIG. 7. The liquid crystal display device of the present invention, comprising:

a bottom substrate 500 comprising a layer of first metal 510, a layer of aluminum nitride 520, and a layer of reflective metal 530, wherein the layer of aluminum nitride 520 is between the layer of first metal 510 and the layer of reflective metal 530; the layer of first metal 510 and the layer of reflective metal 530 have a rugged surface, and the first metal layer 510 is formed with at least one soft metal or the alloys thereof;

an upper substrate 600 comprising at least one transparent electrode 610; and a layer of liquid crystal 700 located between the bottom substrate 500 and the upper substrate 600.

The soft metal for the LCD device of the present invention may be any soft metal with reflective character, preferably Al, Ag, Ni, Cu and Pt. In addition, the upper substrate may further include a color filter 620 deposed between the upper substrate 600 and the transparent electrode 610. The transparent electrode 610 may be any suitable material, such as indium tin oxide or indium zinc oxide. The material of the liquid crystal may be any liquid crystal material with dielectric anisotropy, such as positive dielectric anisotropy or negative dielectric anisotropy.

The LCD device of the present invention may optionally further include any additional functional elements to enhance or improve the desired functions. Preferably, data lines, scan lines, common lines and transistors 540 are formed on or over the surface of the bottom substrate. These data lines and scan lines are arranged to interlace each other without direct electrical connection, and every two adjacent data lines and every two adjacent scan lines define a pixel area. In a given pixel area, one of the data lines on the border of the pixel area is connected to a source 542 of a thin film transistor 540 inside of the pixel area; one of the scan lines on the border of the pixel area is connected to a gate 543 of the thin film transistor inside of the pixel area; and the pixel electrode is connected to the drain 541 of the thin film transistor 540 in the same pixel area.

DETAILED DESCRIPTION OF THE INVENTION

First Preferred Embodiment

Figure 4:
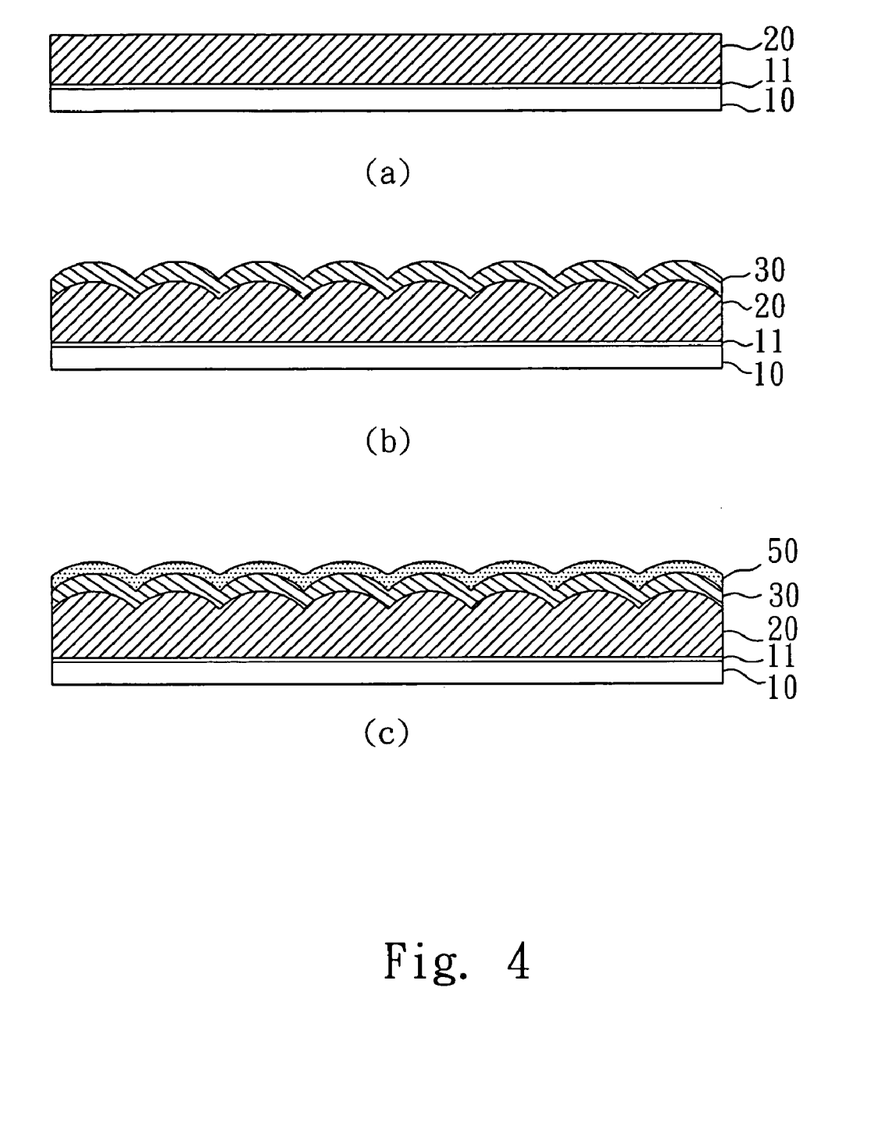
FIG. 4 is a cross-sectional view of a first preferred embodiment of the present invention.

Please refer to FIG. 4(a). First, a substrate 10 is provided. In this embodiment, the substrate is a glass substrate 10. Then, a layer of thick metal 20 as a first metal layer is deposited on the substrate 10. The metal layer is made of Al, or an Al-containing soft alloy, preferably a layer of Al in the preferred embodiment. In addition, in order to increase the adhesion between the Al layer 20 and the substrate 10, a buffer layer 11 is formed between the Al layer 20 and the glass substrate 10 to prevent the Al layer 20 from stripping from the glass substrate 10 during subsequent steps in an environment of extreme high temperature and high pressure. The buffer layer is any suitable material, preferably Ti, titanium nitride, Mo, Cr or the alloys thereof. Ti layer 11 is preferred in this embodiment. The Al layer 20 is formed according to any deposition method or formation method. In this preferred embodiment, sputtering is used. Then, as shown in FIG. 4(b), a layer of aluminum nitride 30 is formed above Al layer 20 in a vacuum sputtering chamber. The aluminum nitride layer 30 is formed according to any deposition method. In this preferred embodiment, the aluminum nitride layer 30 is formed by reactive sputtering under nitrogen atmosphere.

As the aluminum nitride forms, the nitrogen atoms insert in the lattice of the metal and consequently change the lattice of the metal. The insertion results in distortion of the metal lattice close to the surface and the formation of rugged surface of the Al metal 20. The rugged surface can be used as a base for the formation of subsequent reflective layer, conductive layer, or other layers.

In this embodiment, finally, a transparent conductive layer 50 such as ITO, IZO is directly formed on the aluminum nitride layer 30, as shown in FIG. 4(c).

Preferred Embodiment 2

Because aluminum nitride layer 30 does not possess desirable reflective character, a reflective layer 40 is formed above aluminum nitride layer 30 in this embodiment.

Figure 5:
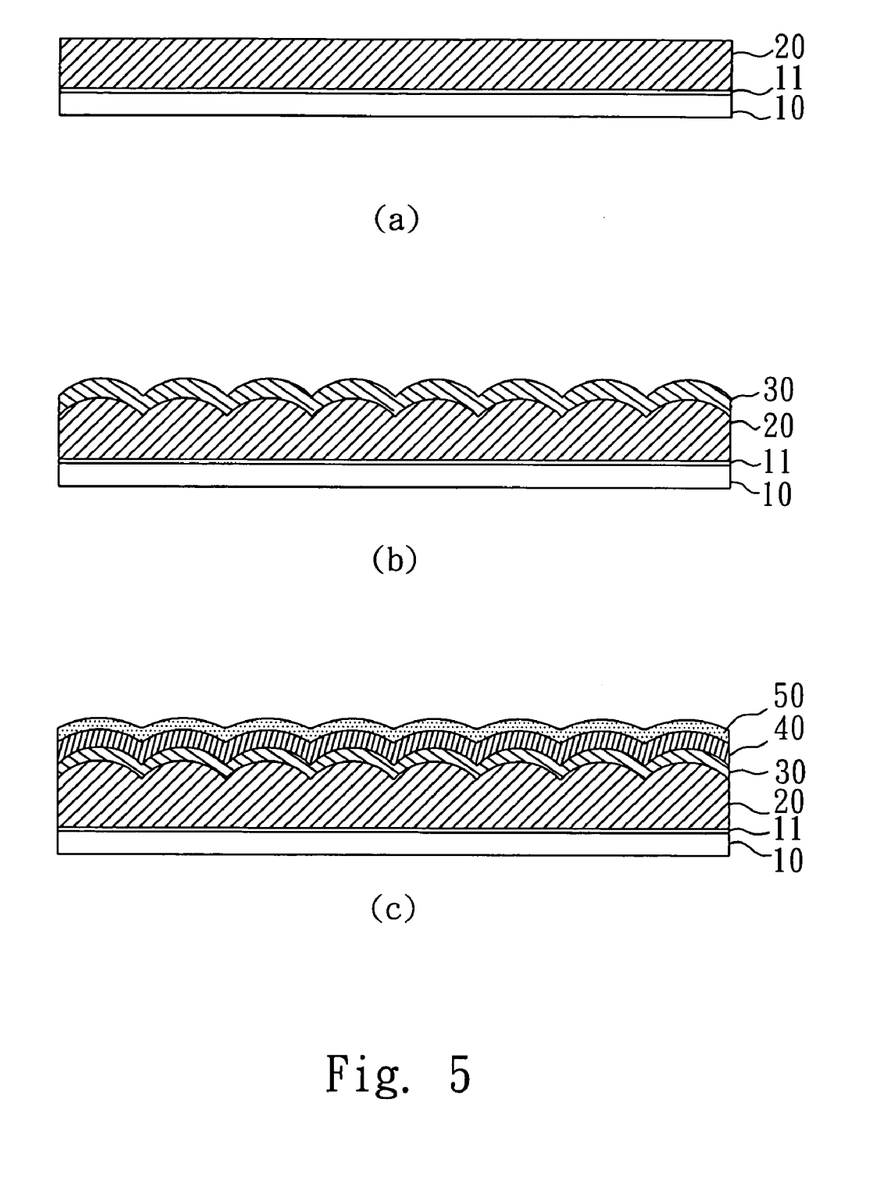
FIG. 5 is a cross-sectional view of a second preferred embodiment of the present invention.

Referring to FIG. 5(a), a Ti layer 11 functioned as buffer layer and an Al layer 20 are deposited on a glass substrate 10 in order. Then, as shown in FIG. 5(b), a aluminum nitride layer 30 is formed above the Al layer 20 by sputtering deposition in a vacuum sputtering chamber, and the resultant Al layer 20 has a rough surface.

A reflective layer 40 is directly formed above the aluminum nitride layer 30. In this embodiment, the reflective layer 40 is made of Al. Finally, a transparent conductive layer 50 such as ITO, IZO is formed above the reflective layer 40, as shown in FIG. 5(c).

Preferred Embodiment 3

Alternatively, after the aluminum nitride layer 30 is formed, the aluminum nitride layer 30 is removed to reveal an Al layer 20 with rough surface to function as reflective layer to proceed with any suitable subsequent procedure.

Figure 6:
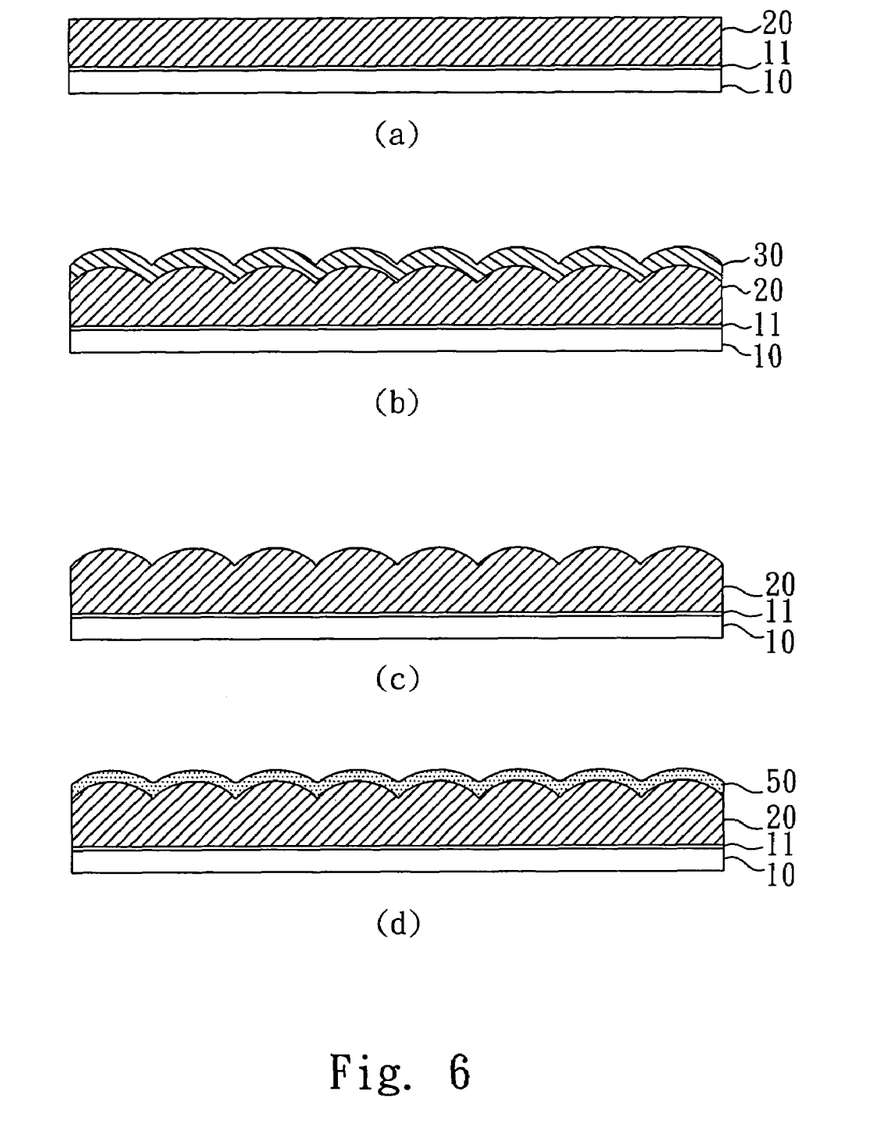
FIG. 6 is a cross-sectional view of a third preferred embodiment of the present invention.

Referring to FIG. 6(a), a glass substrate 10 is provided. Then a Ti layer 11 as buffer layer and an Al layer 20 are deposited on the substrate 10 in order. Afterwards, as shown in FIG. 6(b), a aluminum nitride layer 30 is formed on the Al layer 20 by sputtering deposition in a vacuum sputtering chamber. Similarly, when the aluminum nitride layer 30 is deposited on the Al layer 20, an irregularly rough surface is formed due to the presence of nitrogen atoms inserted among the Al atoms. After the aluminum nitride layer 30 is removed, the surface of Al layer 20 remains rough, as shown in FIG. 6(c). In this embodiment, the aluminum nitride layer 30 is removed by etching. Finally, a transparent conductive layer 50 such as ITO, IZO is formed on the roughened Al layer 20, as shown in FIG. 6(d).

Although the present invention has been explained in relation to its preferred embodiments, it is to be understood that many other possible modifications and variations can be made without departing from the spirit and scope of the invention as hereinafter claimed.

What is claimed is:

1. A method of manufacturing a rugged reflecting layer for diffusion an incident light in a reflective-type liquid crystal display device, comprising the steps of:

(a) providing a transparent substrate having a first metal layer thereon, wherein the first metal layer is formed with at least one soft metal or the alloys thereof;

(b) forming a layer of aluminum nitride on the first metal layer, wherein a rugged interface is formed between the first metal layer and the layer of aluminum nitride while forming the layer of aluminum nitride; and (c) removing the layer of aluminum nitride on the first metal layer.

* * * * *